(12) United States Patent
Narimatu

(10) Patent No.: US 12,175,139 B2
(45) Date of Patent: Dec. 24, 2024

(54) IMAGE FORMING APPARATUS, CONTROL METHOD FOR CONTROLLING IMAGE FORMING APPARATUS, AND NON-TRANSITORY COMPUTER-READABLE STORAGE MEDIUM STORING CONTROL PROGRAM FOR IMAGE FORMING APPARATUS

(71) Applicant: Konica Minolta, Inc., Tokyo (JP)

(72) Inventor: Eiichi Narimatu, Tokyo (JP)

( * ) Notice: Subject to any disclaimer, the term of this patent is extended or adjusted under 35 U.S.C. 154(b) by 0 days.

(21) Appl. No.: 18/356,451

(22) Filed: Jul. 21, 2023

(65) Prior Publication Data

US 2024/0028274 A1 Jan. 25, 2024

(30) Foreign Application Priority Data

Jul. 25, 2022 (JP) .................... 2022-118081

(51) Int. Cl.
G06F 3/12 (2006.01)

(52) U.S. Cl.
CPC .......... *G06F 3/1217* (2013.01); *G06F 3/1208* (2013.01); *G06F 3/121* (2013.01); *G06F 3/1234* (2013.01); *G06F 3/1256* (2013.01); *G06F 3/126* (2013.01); *G06F 3/1273* (2013.01)

(58) Field of Classification Search
CPC ...... G06F 3/1208; G06F 3/1217; G06F 3/121; G06F 3/1234; G06F 3/126; G06F 3/1273
See application file for complete search history.

(56) References Cited

U.S. PATENT DOCUMENTS

| | | | |
|---|---|---|---|
| 11,579,827 B1 * | 2/2023 | Young | G03F 1/84 |
| 2013/0009329 A1 * | 1/2013 | Hofeldt | B29C 59/026 |
| | | | 425/150 |
| 2018/0115656 A1 * | 4/2018 | Noda | G06K 15/1806 |
| 2018/0129457 A1 * | 5/2018 | Akiyama | G06F 3/1219 |
| 2019/0102270 A1 * | 4/2019 | Dennison | G06F 3/121 |

FOREIGN PATENT DOCUMENTS

JP 2018010115 1/2018

* cited by examiner

*Primary Examiner* — John R Wallace
(74) *Attorney, Agent, or Firm* — BakerHostetler

(57) ABSTRACT

An image forming apparatus of a roll-to-roll type includes a hardware processor that functions as a controller. The controller has a real-time adjustment function of printing an adjustment image on a roll sheet, acquiring a reading result of reading the adjustment image from an image reading section, and adjusting an image forming condition in an image forming section in real time based on the reading result during execution of a printing job, and an error-time operation determination function of determining whether to stop or continue the printing job, when an adjustment error in the real-time adjustment function is detected, the determining being based on an occurrence situation of the adjustment error.

13 Claims, 10 Drawing Sheets

| Date | File name | Printing distance at time of error | Printing operation at time of error | Type |
|---|---|---|---|---|
| 22/3/31 | Bottle Label X | 15.0cm | Continued | Density abnormality |
| 22/3/31 | Bottle Label X | 540.0cm | Continued | No patch detection |
| | | | | |
| | | | | |
| | | | | |
| | | | | |

Adjustment error history — R20

FIG. 8

IMAGE FORMING APPARATUS, CONTROL METHOD FOR CONTROLLING IMAGE FORMING APPARATUS, AND NON-TRANSITORY COMPUTER-READABLE STORAGE MEDIUM STORING CONTROL PROGRAM FOR IMAGE FORMING APPARATUS

CROSS REFERENCE TO RELATED APPLICATIONS

This application claims priority to Japanese Patent Application No. 2022-118081 filed on Jul. 25, 2022, the disclosure of which is incorporated herein in its entirety.

BACKGROUND

Technological Field

The present disclosure relates to an image forming apparatus, a control method for controlling an image forming apparatus, and a non-transitory computer-readable storage medium storing a control program for an image forming apparatus.

Description of Related Art

Conventionally, an image forming apparatus is known which has a function of printing an adjustment patch separately from an image to be printed on a recording medium during execution of a printing job, reading the adjustment patch with an in-line sensor, and adjusting an image forming condition in an image forming section in real time based on the reading result (hereinafter, referred to as a "real-time adjustment function") (see, for example, Japanese Unexamined Patent Publication No. 2018-010115).

In the real-time adjustment, the adjustment patch (hereinafter, also referred to as an "adjustment image") is printed in a margin region on all pages of sheets, a correction value is calculated by reading the adjustment patch using an image sensor such as a CCD mounted on a post-processing machine, and the calculated value is applied to an image being printed, thereby stabilizing colors of the image forming apparatus. Adjustment items in the real-time adjustment include tone correction, density correction, color unevenness correction, and the like.

SUMMARY

An object of the present disclosure is to provide an image forming apparatus of a roll-to-roll type capable of minimizing the frequency of suspension of printing jobs when real-time adjustment is applied, a control method for controlling the image forming apparatus, and a non-transitory computer-readable storage medium storing a control program for the image forming apparatus.

In order to achieve at least one of the aforementioned objects, the image forming apparatus reflecting one aspect of the present disclosure is an image forming apparatus of a roll-to-roll type, including: an image former that includes an image bearing member carrying toner and that prints an image on a roll sheet, the image being formed by exposure of and development processing on the image bearing member; an image reader that reads the image formed on the roll sheet; and a hardware processor that functions as a controller for controlling the image former based on a printing job for which an execution instruction is received, in which the controller has a real-time adjustment function of printing an adjustment image on the roll sheet, acquiring a reading result of reading the adjustment image from the image reader, and adjusting an image forming condition in the image former in real time based on the reading result while the printing job is being executed, and an error-time operation determination function of determining whether to stop or continue the printing job, when an adjustment error indicating failure of the adjustment in the real-time adjustment function is detected, the determining being based on an occurrence situation of the adjustment error.

Further, a control method for controlling an image forming apparatus reflecting another aspect of the present disclosure is a control method for controlling an image forming apparatus of a roll-to-roll type, the control method including: printing an adjustment image on a roll sheet, acquiring a reading result of reading the adjustment image from an image reader, and adjusting an image forming condition in an image former in real time based on the reading result while a printing job is being executed; and determining whether to stop or continue the printing job, when an adjustment error indicating failure of the adjustment is detected, the determining being based on an occurrence situation of the adjustment error.

A non-transitory computer-readable storage medium storing a control program for an image forming apparatus reflecting still another aspect of the present disclosure is a non-transitory computer-readable storage medium storing a control program for an image forming apparatus of a roll-to-roll type, in which when the control program is executed by a computer, the computer prints an adjustment image on a roll sheet, acquires a reading result of reading the adjustment image from an image reader, and adjusts an image forming condition in an image former in real time based on the reading result while a printing job is being executed; and determines whether to stop or continue the printing job, when an adjustment error indicating failure of the adjustment is detected, the determining being based on an occurrence situation of the adjustment error.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram illustrating an example of an error position indication mark printed on a roll sheet in the image forming apparatus according to the embodiment;

DETAILED DESCRIPTION OF EMBODIMENTS

Figure 1:
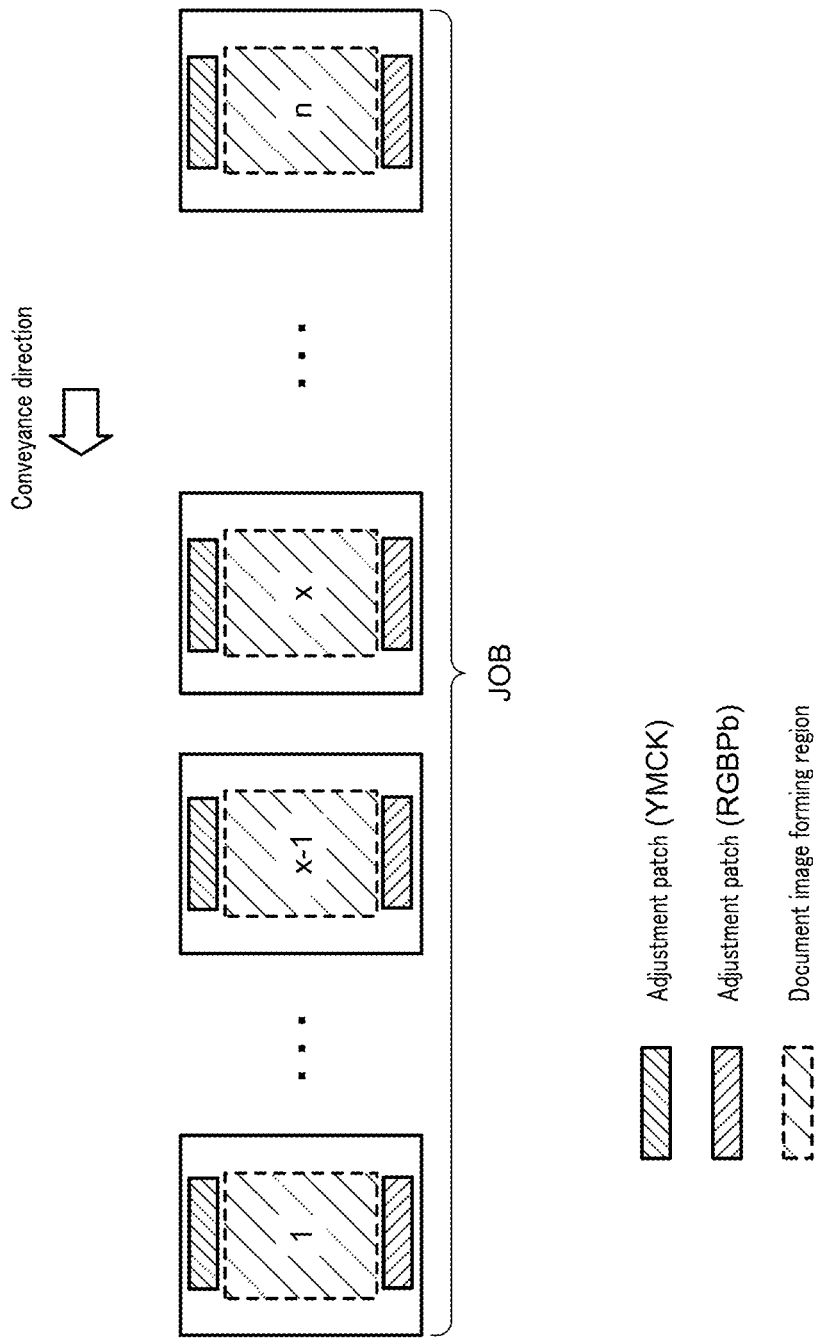
FIG. 1 is a diagram illustrating an example of an adjustment patch attached to a sheet in a real-time adjustment function.

Hereinafter, one or more embodiments of the present invention will be described with reference to the drawings. However, the scope of the invention is not limited to the disclosed embodiments.

Hereinafter, preferred embodiments of the present disclosure will be described in detail with reference to the accompanying drawings. In this specification and the drawings, components having substantially the same functions are denoted by the same reference numerals, and redundant description thereof will be omitted.

FIG. 1 is a diagram illustrating an example of the adjustment patch attached to a sheet in the real-time adjustment function. In FIG. 1, as an example of the adjustment patch, a patch including images of colors of Y, M, C, and K and images of colors of RGBPb (Pb=black formed by superimposing YMC) is illustrated. A patch region is formed, for example, in an edge region of the sheet that is separate from a document image forming region, and is eventually cut using a cutter.

Typically, this type of image forming apparatus does not perform the real-time adjustment and recognizes that an adjustment error indicating a failure of the adjustment (hereinafter, simply referred to as an "adjustment error") has occurred, in a case where a required correction amount of an adjustment target in the real-time adjustment exceeds a fixed threshold value. In a case where this type of adjustment error is detected, in a single-sheet type image forming apparatus, usually, a sheet being printed is ejected to a sub-tray to interrupt a job, and reprinting is performed from a place where the adjustment error has occurred.

Meanwhile, an image forming apparatus of a roll-to-roll type (see FIG. 3) that uses a roll sheet as a recording medium and forms an image on the roll sheet is known.

In the image forming apparatus of a roll-to-roll type, a sheet (i.e., roll sheet) passes through a fixing device in the apparatus even when a printing job (i.e., image formation processing) is interrupted. Therefore, the sheet conveyance itself cannot be stopped. As a result, there is a problem that a blank region corresponding to a distance by which the sheet is conveyed while the printing job is stopped is generated in the sheet.

Figure 2:
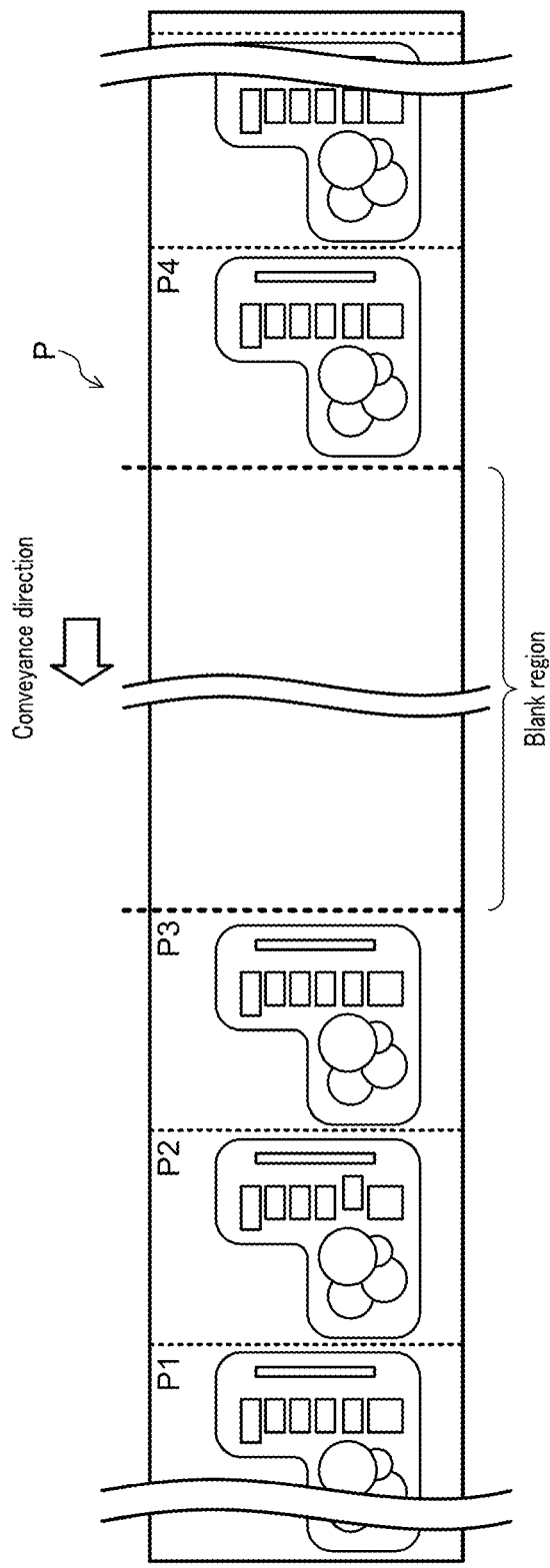
FIG. 2 is a diagram illustrating an example of a blank region generated in a roll sheet after printing.

FIG. 2 illustrates an example of a blank region generated in a roll sheet after printing. In general, the roll sheet in which the blank region is generated is treated as a defective product. For example, in a case where the printing target is a label as illustrated in FIG. 2, a label-formed position deviates in the middle of the printing. Thus, misregistration of the label occurs when the label is attached to a PET bottle or the like by a labeler machine. Therefore, in the case where the blank region is generated in the roll sheet, it is necessary for an operator to perform an operation of manually cutting out the blank region in the roll sheet and then joining together both ends of the blank region or the like at a work site, which causes a decrease in production efficiency or the like.

That is, in the image forming apparatus of a roll-to-roll type, as in the single-sheet type image forming apparatus, there is a problem that when an operation control is performed to temporarily stop a printing job every time an adjustment error of real-time adjustment is detected, many blank regions are formed in a printed roll sheet as a final product (hereinafter, also referred to as "product roll sheet").

[Overall Configuration of Image Forming Apparatus]

Hereinafter, an example of a configuration of an image forming apparatus (hereinafter, referred to as "image forming apparatus U") according to an embodiment of the present disclosure will be described with reference to FIGS. 3 and 4.

Figure 3:
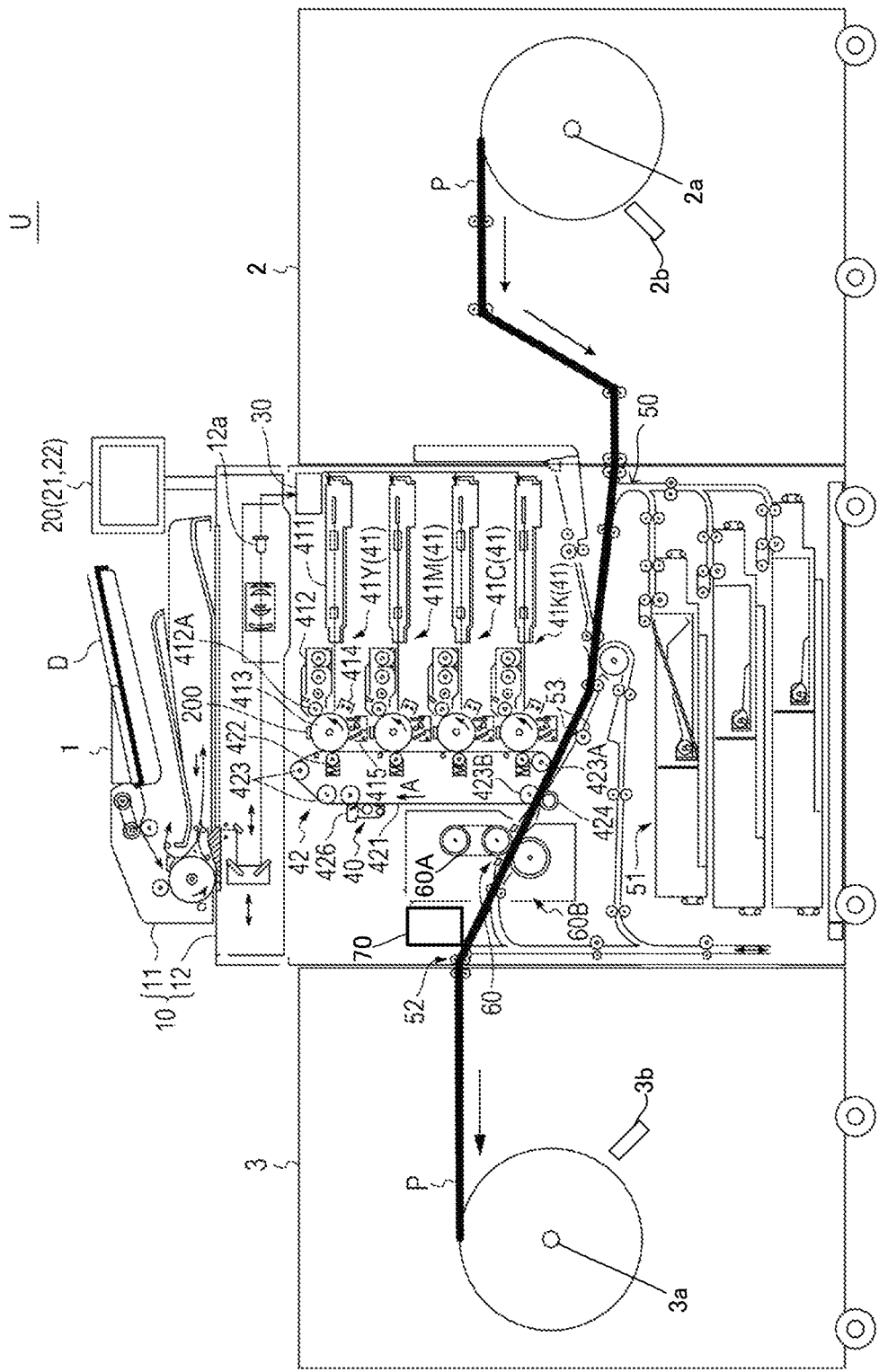
FIG. 3 is a diagram schematically illustrating an overall configuration of an image forming apparatus according to an embodiment.

FIG. 3 is a view schematically illustrating an overall configuration of image forming apparatus U according to the present embodiment. FIG. 4 is a diagram illustrating a configuration of a control system of image forming unit 1 included in image forming apparatus U according to the present embodiment.

Image forming apparatus U is an image forming apparatus of a roll-to-roll type that uses roll sheet P as a recording medium and forms an image on roll sheet P. As shown in FIG. 3, image forming apparatus U is configured by connecting sheet feed unit 2, image forming unit 1, and winding unit 3 from the upstream side along the conveyance direction of roll sheet P.

Sheet feed unit 2 is a device that feeds roll sheet P to image forming unit 1. In a housing of sheet feed unit 2, roll sheet P is wound around sheet feed roller 2*a* in a roll shape and is rotatably held. Sheet feed unit 2 conveys roll sheet P wound around sheet feed roller 2*a* to image forming unit 1 at a constant speed via, for example, a plurality of conveyance roller pairs. The sheet feed operation of sheet feed unit 2 is controlled by controller 100 included in image forming unit 1. Sheet feed unit 2 has optical sensor 2*b* for detecting the thickness from the axis of sheet feed roller 2*a* to the outermost periphery of roll sheet P.

Image forming unit 1 forms a color image by utilizing an electrophotographic process technology. That is, image forming unit 1 primarily transfers, to intermediate transfer belt 421, toner images of respective toner colors of Y (yellow), M (magenta), C (cyan), and K (black) formed on photosensitive drums 413. Image forming unit 1 superimposes the toner images of four colors on intermediate transfer belt 421, and then secondarily transfers the toner images to roll sheet P fed from sheet feed unit 2, thereby forming a color image on roll sheet P.

Image forming unit 1 adopts a tandem system whereby photosensitive drums 413 corresponding to the four colors of Y, M, C, and K are arranged in series in a travel direction of intermediate transfer belt 421, and the toner images of the respective toner colors are sequentially transferred onto intermediate transfer belt 421 by a single procedure.

Figure 4:
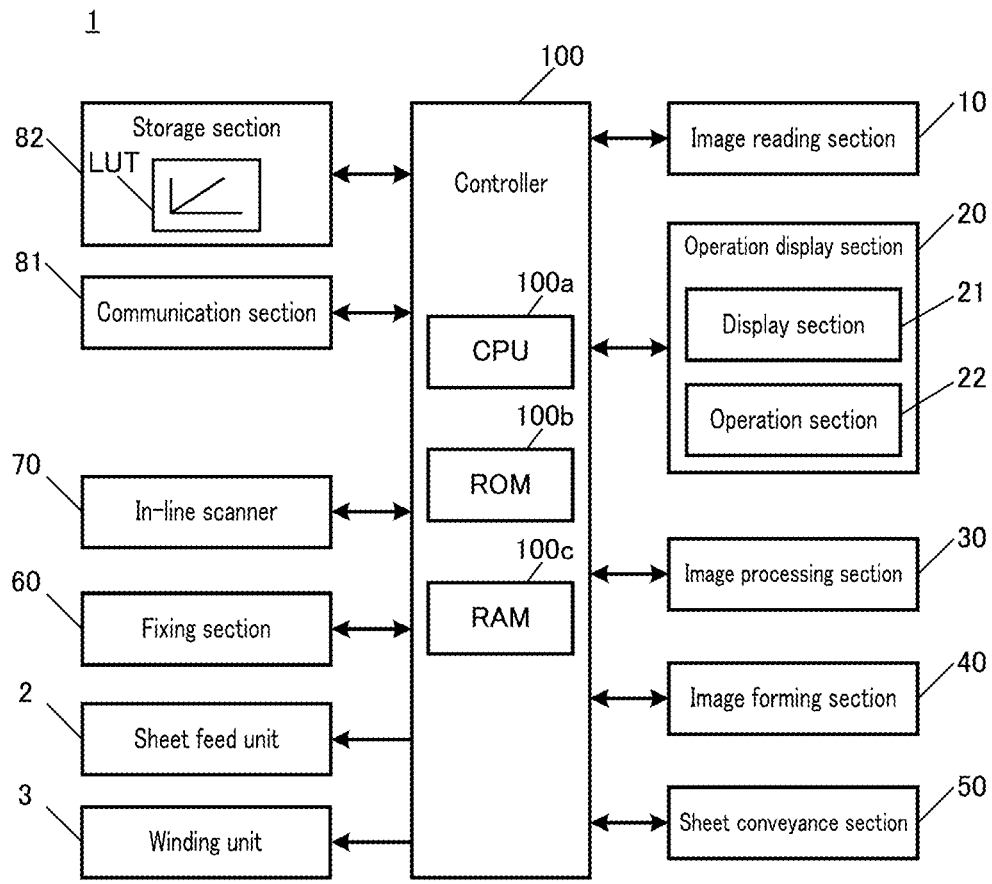
FIG. 4 is a diagram illustrating a configuration of a control system of an image forming unit included in the image forming apparatus according to the embodiment.

As shown in FIG. 4, image forming unit 1 includes image reading section 10, operation display section 20, image processing section 30, image forming section 40, sheet conveyance section 50, fixing section 60, in-line scanner 70, communication section 81, storage section 82, and controller 100.

Controller 100 includes central processing unit (CPU) 100*a*, read only memory (ROM) 100*b*, random access memory (RAM) 100c, and the like. CPU 100a reads a program corresponding to processing contents from ROM 100b, loads the program into RAM 100c, and centrally controls the operation of each block or the like of image forming unit 1 in cooperation with the loaded program. At this time, various kinds of data stored in storage section 82 are referred to. Storage section 82 is configured by, for example, a nonvolatile semiconductor memory (so-called flash memory) or a hard disk drive. CPU 100a is an example of a hardware processor that functions as controller 100.

Controller 100 exchanges various kinds of data with an external device (e.g., a personal computer (not illustrated)) connected to a communication network such as a local area network (LAN) or a wide area network (WAN) via communication section 81. For example, controller 100 receives image data (input image data) transmitted from the external device, and forms an image on roll sheet P based on the image data. Communication section 81 is constituted by a communication control card such as a LAN card, for example.

As shown in FIG. 3, image reading section 10 includes automatic document feeding device 11 called an Auto Document Feeder (ADF), document image scanning device 12 (scanner), and the like.

Automatic document feeding device 11 conveys document D placed on a document tray by a conveyance mechanism and sends document D to document image scanning device 12. By automatic document feeding device 11, images (including both sides) of a large number of documents D placed on the document tray can be continuously read at once.

Document image scanning device 12 optically scans a document conveyed from automatic document feeding device 11 onto a contact glass or a document placed on the contact glass. Document image scanning device 12 causes light reflected from the document to form an image on a light receiving surface of charge-coupled device (CCD) sensor 12a and reads the document image. Image reading section 10 generates input image data based on a result of reading by document image scanning device 12. The input image data is subjected to predetermined image processing in image processing section 30.

As shown in FIG. 3, operation display section 20 is, for example, a liquid crystal display (LCD) with a touch panel and functions as display section 21 and operation section 22. Display section 21 displays various operation screens, a state of an image, an operation state of each function, information regarding printing, and the like according to a display control signal input from controller 100. Operation section 22 includes various operation keys such as a numeric keypad and a start key, receives various input operations by a user, and outputs an operation signal to controller 100.

Image processing section 30 includes a circuit or the like that performs digital image processing on input image data according to an initial setting or a user setting. For example, image processing section 30 performs tone correction based on tone correction data (tone correction table) under the control of controller 100. Image processing section 30 performs various correction processes such as color correction and shading correction, a compression process, and the like in addition to the tone correction on the input image data. Image forming section 40 is controlled based on the processed image data.

As illustrated in FIG. 3, image forming section 40 includes toner image forming sections 41Y, 41M, 41C, and 41K for forming images with color toners of a Y component, an M component, a C component, and a K component, based on the input image data, and includes intermediate transfer unit 42.

Toner image forming sections 41Y, 41M, 41C, and 41K for the Y component, the M component, the C component, and the K component have a similar configuration. For convenience of illustration and description, common components are denoted by the same reference numerals, and when the components are distinguished from each other, Y, M, C, or K is added to the reference numerals. In FIG. 3, reference signs are representatively given to the constituent elements of toner image forming section 41Y for the Y component, and reference signs of the constituent elements of other toner image forming sections 41M, 41C, and 41K are omitted.

Toner image forming sections 41 include exposure devices 411, developing devices 412, photosensitive drums 413, charging devices 414, drum cleaning devices 415, toner collecting sections 200, and the like.

Each of photosensitive drums 413 is formed of, for example, an organic photosensitive member in which a photosensitive layer made of a resin containing an organic photoconductor is formed on the outer peripheral surface of a drum-shaped metal substrate. Note that controller 100 controls drive current supplied to a drive motor (not illustrated) that rotates photosensitive drum 413, thereby rotating photosensitive drum 413 at a constant circumferential velocity.

Each of charging devices 414 is, for example, an electrostatic charger, and uniformly charges the surface of photoconductive photosensitive drum 413 to a negative polarity by generating corona discharge.

Each of exposure devices 411 includes a semiconductor laser, for example, and emits laser light corresponding to an image of each toner color component toward photosensitive drum 413. As a result, an electrostatic latent image of each toner color component is formed in an image region irradiated with the laser light on the surface of photosensitive drum 413 due to a potential difference from a background region.

Each of developing devices 412 is a developing device of a two component reverse rotation type, and attaches a developer of each toner color component to the surface of photosensitive drum 413 to visualize and develop the electrostatic latent image as a toner image.

Developing roller 412A of developing device 412 carries the developer while rotating, and supplies the toner contained in the developer to photosensitive drum 413. Specifically, a developing bias is applied from developing bias applying section 412B to developing roller 412A, and a potential difference is generated between developing roller 412A and the surface of photosensitive drum 413, thereby forming a toner image on the surface of photosensitive drum 413.

Each of drum cleaning devices 415 is brought into contact with the surface of photosensitive drum 413, has an elastic plate-like drum cleaning blade or the like, and removes the toner remaining on the surface of photosensitive drum 413 without being transferred to intermediate transfer belt 421.

Intermediate transfer unit 42 includes intermediate transfer belt 421, primary transfer roller 422, a plurality of support rollers 423, secondary transfer roller 424, and belt cleaning device 426.

Intermediate transfer belt 421 is formed of an endless belt and is wound under tension around a plurality of support rollers 423 in a loop shape. At least one of the plurality of support rollers 423 is constituted by a driving roller, and the others are constituted by driven rollers. For example, preferably, roller 423A arranged on the downstream side in a belt travel direction relative to primary transfer roller 422 for the K component is the drive roller. Thus, the travelling speed of the belt at a primary transfer section is easily kept constant. As driving roller 423A rotates, intermediate transfer belt 421 travels in the direction of arrow A at a constant speed.

Intermediate transfer belt 421 is a belt having conductivity and elasticity and has a high-resistance layer on its surface. Intermediate transfer belt 421 is rotationally driven by a control signal from controller 100.

Primary transfer roller 422 is arranged on an inner peripheral surface side of intermediate transfer belt 421 in such a manner as to face photosensitive drum 413 of each toner color component. Primary transfer roller 422 is brought into pressure contact with photosensitive drum 413 with intermediate transfer belt 421 interposed therebetween, thereby forming a primary transfer nip for transferring a toner image from photosensitive drum 413 to intermediate transfer belt 421.

Secondary transfer roller 424 is disposed on the outer peripheral surface side of intermediate transfer belt 421 so as to face backup roller 423A disposed on the downstream side of driving roller 423B in the belt traveling direction. Secondary transfer roller 424 is pressed against backup roller 423B with intermediate transfer belt 421 interposed therebetween, whereby a secondary transfer nip for transferring the toner image from intermediate transfer belt 421 to roll sheet P is formed.

When intermediate transfer belt 421 passes through the primary transfer nip, the toner images on photosensitive drums 413 are sequentially primary-transferred onto intermediate transfer belt 421 in a superimposed manner. Specifically, the toner images are electrostatically transferred to intermediate transfer belt 421 by: applying primary transfer bias to primary transfer roller 422; and applying electric charge having an opposite polarity of the toner to a back-surface side of intermediate transfer belt 421, that is to say, a side on which primary transfer roller 422 abuts.

Thereafter, when roll sheet P passes through the secondary transfer nip, the toner image on intermediate transfer belt 421 is secondarily transferred to roll sheet P. Specifically, a secondary transfer bias is applied to secondary transfer roller 424, and an electric charge having a polarity opposite to that of the toner is applied to the back side of roll sheet P, that is, the side in contact with secondary transfer roller 424, whereby the toner image is electrostatically transferred to roll sheet P. Roll sheet P to which the toner image has been transferred is conveyed toward fixing section 60.

Belt cleaning device 426 removes transfer residual toner remaining on the surface of intermediate transfer belt 421 after the secondary transfer. Instead of secondary transfer roller 424, a so-called belt-type secondary transfer unit having a configuration in which a secondary transfer belt is wound in a loop shape under tension around a plurality of support rollers including the secondary transfer roller may be employed.

Fixing section 60 includes upper fixing section 60A having a fixing surface-side member arranged on the fixing surface side of roll sheet P, that is, the side on which the toner image is formed, lower fixing section 60B having a back surface-side support member arranged on the back surface side of roll sheet P, that is, the side opposite to the fixing surface side, and a heating source and the like. The back-surface-side support member is brought into pressure contact with the fixing-surface-side member, whereby a fixing nip for nipping and conveying roll sheet P is formed. At the fixing nip, fixing section 60 heats and presses roll sheet P on which the toner image is secondarily transferred and which is conveyed, so as to fix the toner image on roll sheet P.

In-line scanner 70 (corresponding to the "image reading section" of the present invention) captures and reads an image relating to the adjustment patch formed on roll sheet P by, for example, a built-in Charge Coupled Device (CCD) sensor or a Complementary Metal Oxide Semiconductor (CMOS) sensor (for example, in a case where the printing target is a label as shown in FIG. 2, a deviation occurs in a label-formed position in the middle of printing, and accordingly, misregistration of the label occurs when the label is attached to a PET bottle or the like by a labeler machine). In-line scanner 70 is disposed, for example, at a position facing roll sheet P on the downstream side of fixing section 60 of conveyance path section 53. In addition, in-line scanner 70 can perform imaging in each wavelength band of RGB, for example.

Sheet conveyance section 50 includes sheet feed section 51, sheet ejection section 52, and conveyance path section 53. Conveyance path section 53 includes a plurality of conveyance roller pairs and conveys roll sheet P fed from sheet feed unit 2 to image forming section 40 and fixing section 60, and then sends roll sheet P to winding unit 3. The plurality of conveyance roller pairs of conveyance path section 53 includes a registration roller pair for correcting inclination and deviation of roll sheet P.

Note that sheet feed section 51 is a sheet feed section for plain paper, which is provided separately from sheet feed unit 2, and feeds a sheet that does not have a length exceeding a main part width of image forming unit 1. In three sheet feed tray units constituting sheet feed section 51, sheets identified based on basis weight, size, or the like are stored for each type set in advance.

Roll sheet P fed from sheet feed unit 2 to image forming unit 1 is conveyed to image forming section 40 by conveyance path section 53. Then, in image forming section 40, the toner image on intermediate transfer belt 421 is secondarily transferred to one surface of roll sheet P at a time, and a fixing process is performed in fixing section 60. Roll sheet P on which the image has been formed is conveyed to winding unit 3 by sheet ejection section 52 which includes a conveyance roller pair.

Winding unit 3 is a device that winds roll sheet P conveyed from image forming unit 1. In a housing of winding unit 3, for example, roll sheet P is wound around sheet ejection roller 3a to be held in a roll shape. That is, winding unit 3 winds roll sheet P conveyed from image forming unit 1 around sheet ejection roller 3a at a constant speed via a plurality of conveyance roller pairs. Winding unit 3 has optical sensor 3b for detecting the thickness from the axis of sheet ejection roller 3a to the outermost peripheral portion of wound roll sheet P.

[Detailed Configuration of Controller 100]

Figure 5:
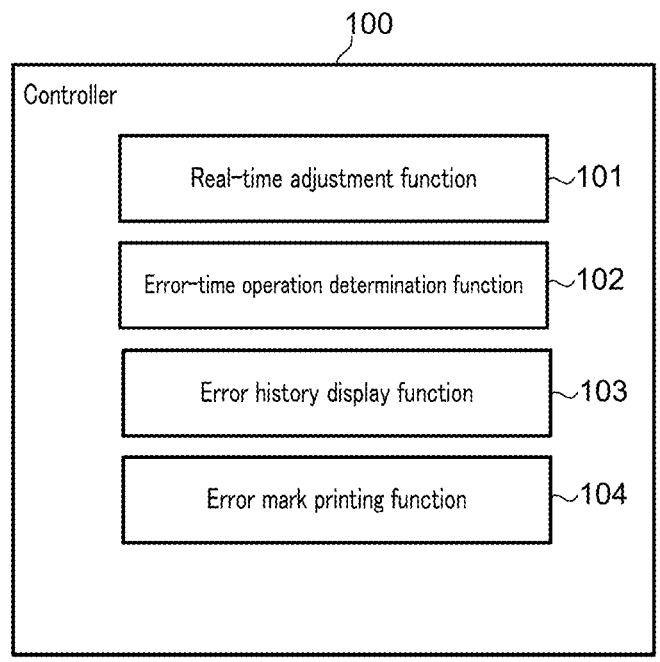
FIG. 5 is a diagram illustrating a functional configuration of a controller according to the embodiment.

FIG. 5 is a diagram illustrating a functional configuration of controller 100 according to the present embodiment.

Controller 100 has real-time adjustment function 101, error-time operation determination function 102, error history display function 103, and error mark printing function 104.

Real-time adjustment function 101 prints an adjustment patch in a margin region or the like of roll sheet P while a printing job is being executed (that is, while printing on roll sheet P is being executed). Along with the printing, real-time adjustment function 101 acquires the reading result of reading the adjustment patch from in-line scanner 70 and adjusts the image forming condition in image forming section 40 in real time based on the reading result.

The method by which real-time adjustment function 101 adjusts the image forming condition is, for example, the same as the method according to the related art (see, for example, Japanese Unexamined Patent Publication No. 2018-010115). For example, real-time adjustment function 101 calculates an adjustment value (correction value) of tone correction based on the reading result of reading the adjustment patch and performs correction of a charging bias of charging device 414 of image forming section 40, correction of an exposure light amount and an exposure position of exposure device 411, correction of a developing bias of developing device 412, or the like. Real-time adjustment function 101 prevents a change in an image during execution of a printing job and performs color stabilization and the like by these corrections. Here, the tone correction is given as an example of the adjustment item of real-time adjustment function 101, but real-time adjustment function 101 may perform density correction or color unevenness correction.

The adjustment patch is, for example, a pattern of images of respective colors of Y, M, C, and K and images of respective colors of RGBPb (Pb=black formed by superimposing Y, M, C, and K) similarly to the adjustment patch described in FIG. 1. Real-time adjustment function 101 forms the adjustment patch in a predetermined margin region within each page of roll sheet P, for example, in order that a tone shift of each color occurring while a printing job is being performed can be detected.

Error-time operation determination function 102 is a function of determining whether to stop or continue the printing job currently being executed, based on the occurrence situation of an adjustment error when the adjustment error in real-time adjustment function 101 is detected.

In general, there are various factors that cause an adjustment error in the real-time adjustment, and there are a periodic phenomenon that occurs due to contamination or the like on a conveyance roller or an intermediate transfer belt (for example, in a case where a printing target is a label as illustrated in FIG. 2, a shift occurs in a label-formed position during printing, and thus a label position shift occurs in a case where a labeler attaches the label to a PET bottle or the like), and a sudden or temporary phenomenon that occurs due to toner spill from a developing device or the like. Furthermore, the adjustment error may occur due to a setting mistake by a user (e.g., an error in sheet size setting). In addition, the contents of the error include a serious error that greatly affects the image quality of the entire print image, and a minor or sporadic error that does not greatly affect the image quality of the print image, such as an error in a margin portion.

In this point, as described above, in terms of suppressing insertion of a blank region into a print image on the product roll sheet, some users desire to continue printing without stopping it also when the adjustment error is detected, and the occurrence cause of the adjustment error is temporary or minor. The case where the cause of the occurrence of the adjustment error is temporary or minor is a case where the influence of the detected cause of the occurrence of the adjustment error on a subsequent printing is minor.

However, since there are various causes of occurrence of the adjustment error as described above, the cause of the occurrence of the adjustment error cannot be uniquely specified only by the image information of the adjustment patch (for example, the abnormal density of the image and the dead image in the adjustment patch). Therefore, as a result of intensive studies, the inventors of the present invention have adopted a configuration in which it is determined whether to stop or continue printing that is currently being executed, based on an occurrence situation of a detected adjustment error. This is based on the new knowledge of the inventors of the present application that it is possible to estimate an influence of an occurrence cause of the detected adjustment error on a subsequent printing from the occurrence situation of the detected adjustment error.

That is, in image forming apparatus U according to the present embodiment, it is determined whether to stop or continue printing that is currently being performed based on the occurrence situation of a detected adjustment error, thereby suppressing the frequency of temporarily stopping the printing operation of image forming apparatus U to a bare minimum. Thus, a situation in which an unnecessarily large blank region is formed in the product roll sheet is suppressed.

The occurrence situation of the adjustment error to be determined by error-time operation determination function 102 is specifically the occurrence timing of the adjustment error or the occurrence frequency of the adjustment error, and more specifically, error-time operation determination function 102 specifies the occurrence situation of the adjustment error based on the image formation distance of image formation performed from the start of the printing job to the detection of the adjustment error or the number of times of the detection of the adjustment error from the start of the printing job, as will be described later.

When an adjustment error is detected during execution of a printing job, error-time operation determination function 102 according to the present embodiment applies one or a plurality of determination modes from among the following first to fourth determination modes and determines whether to stop or continue printing that is currently being executed. The first to the fourth determination modes are modes for specifying the occurrence timing or the occurrence frequency of the adjustment error.

First, in a case where the adjustment error is detected when the image formation distance of image formation onto roll sheet P in the printing job (that is, the image formation distance from the start of the printing job to the current time point) is less than the first threshold value, error-time operation determination function 102 controls the operation of image forming apparatus U so as to stop the printing job. Alternatively, if an adjustment error is detected when the image formation distance of image formation on roll sheet P in the printing job is equal to or greater than the first threshold value, error-time operation determination function 102 controls the operation of image forming apparatus U to continue the printing job. These operation controls are hereinafter referred to as the "first determination mode."

The image formation distance of image formation onto roll sheet P in the printing job is one index for measuring the printing time from the start of printing to the detection of the adjustment error. As the first threshold value described above, for example, the image formation distance of image formation onto roll sheet P that corresponds to a start portion of the printing job is set. At this time, the image formation distance of image formation onto roll sheet P may be set as the number of pages or as an actual distance.

For example, when an adjustment error is detected on the first page of a printing job, it is conceivable that the cause of the adjustment error is an error in the user's print setting (e.g., the size of roll sheet set in the user's print setting is different from the size of roll sheet loaded in the apparatus main part). Further, also in the case of a page other than the first page of the printing job, when the adjustment error is detected at the start portion of the printing job, there is a high possibility that the cause of the occurrence of the adjustment error is something that causes the adjustment error at a high frequency (for example, dirt on the conveyance roller and the intermediate transfer belt). In this case, the cause of the error is highly likely to significantly affect the image quality of the entire print image, and the product roll sheet itself may become a waste product if printing is continued as it is.

On the other hand, when an adjustment error is detected after the image formation distance of image formation onto roll sheet P reaches a distance equal to or longer than a predetermined distance (e.g., near the last page) during a printing job, there is a high possibility that the cause of the adjustment error is temporary or infrequent (e.g., toner spillage from the developing device). In such a case, since the operation of the real-time adjustment function tends to be restored immediately after the adjustment error is detected, there is a low possibility that the cause of the error greatly affects the image quality of the entire print image. The first determination mode is set based on such a viewpoint.

Further, error-time operation determination function 102 controls the operation of image forming apparatus U so as to stop the printing job when the adjustment error is detected when the load amount of roll sheet P wound around sheet ejection roller 3a is less than the second threshold value. In addition, error-time operation determination function 102 controls the operation of image forming apparatus U so as to continue the printing job if an adjustment error is detected when the amount of roll sheet P wound around sheet ejection roller 3a is equal to or greater than the second threshold value. These operation controls are hereinafter referred to as the "second determination mode."

Note that as the second threshold value described above, for example, the load amount of roll sheet P wound around sheet ejection roller 3a that corresponds to the start portion of the printing job (e.g., the number of times of winding of roll sheet is 10) or the like is set. The load amount of roll sheet P wound around sheet ejection roller 3a is specified by, for example, optical sensor 3b (see FIG. 3) that detects the thickness from the axis of sheet ejection roller 3a to the outermost peripheral portion of the wound roll sheet.

If the adjustment error is detected when the remaining amount of roll sheet P wound around sheet feed roller 2a is equal to or greater than the third threshold value, error-time operation determination function 102 controls the operation of image forming apparatus U so as to stop the printing job. If an adjustment error is detected when the remaining amount of roll sheet P wound around sheet feed roller 2a is less than the third threshold value, error-time operation determination function 102 controls the operation of image forming apparatus U so as to continue the printing job. These operation controls are hereinafter referred to as the "third determination mode."

Note that as the third threshold value described above, for example, the remaining amount of roll sheet P wound around sheet feed roller 2a that corresponds to the start portion of the printing job (e.g., the number of times of feeding from sheet feed roller 2a is 10 wounds) or the like is set. The remaining amount of roll sheet P wound around sheet feed roller 2a is determined by, for example, optical sensor 2b (see FIG. 3) that detects the thickness from the axis of sheet feed roller 2a to the outermost periphery of wound roll sheet P.

Like the image formation distance of image formation on roll sheet P in the printing job (first determination mode), both of the load amount of roll sheet P wound around sheet ejection roller 3a (second determination mode) and the remaining amount of roll sheet P wound around sheet feed roller 2a (third determination mode) are indices for measuring the print time taken until an adjustment error is detected after printing is started.

However, generally, in image forming apparatus U, depending on user setting, it is possible to divide one printing job into a plurality of short jobs to execute printing. In such a case, since the printing job being executed is sequentially switched, it is not possible to accurately grasp the frequency or the like of the occurrence of the adjustment error based on the image formation distance of image formation onto roll sheet P in the printing job being currently executed as in the first determination mode. From such a viewpoint, in the second determination mode and the third determination mode, the occurrence situation of the adjustment error is specified based on the load amount of roll sheet P wound around sheet ejection roller 3a and/or the remaining amount of roll sheet P wound around the sheet feed roller instead of the image formation distance of image formation onto roll sheet P in the printing job.

The reason why the second determination mode and the third determination mode are separately provided is to enable setting of a determination mode more matching the usage of image forming apparatus U by the user. In estimating the printing time from the start of printing to the detection of an adjustment error, there are cases where it is better to use the load amount of roll sheet wound on sheet ejection roller 3a as an index and cases where it is better to use the remaining amount of roll sheet wound on sheet feed roller 2a as an index. Which case is better depends on, for example, the size of roll sheet P to be printed (for example, the number of times of winding of roll sheet P) and the printing distance as a determination criterion related to the stop or continuation of the job (for example, the start portion or the end portion of the printing job). In addition, some user may execute printing while sequentially joining roll sheet P wound around sheet feed roller 2a or execute printing while cutting roll sheet P wound around sheet ejection roller 3a in the middle. This case also includes cases where it is better to use the load amount of roll sheet wound on sheet ejection roller 3a as an index and cases where it is better to use the remaining amount of roll sheet wound on sheet feed roller 2a as an index, in order to identify the occurrence situation of an adjustment error.

When the number of times the adjustment error is detected after the printing job is started is equal to or greater than the fourth threshold value, error-time operation determination function 102 controls the operation of image forming apparatus U to stop the printing job. Furthermore, when the number of times the adjustment error is detected after the printing job is started is less than the fourth threshold value, error-time operation determination function 102 controls the operation of image forming apparatus U so as to continue the printing job. These operation controls are hereinafter referred to as the "fourth determination mode."

The number of times the adjustment error is detected after starting the printing job (fourth determination mode) is an index for measuring the frequency of occurrence of the adjustment error. In general, when the number of times an adjustment error is detected exceeds a predetermined number of times, there is a high possibility that the cause of the occurrence of the adjustment error is such a serious one as damage, abnormality, or other defects of the developing device, the exposure device, the conveyance roller, the intermediate belt, or the like. In such a case, the image quality of the print image is significantly deteriorated, and the influence thereof extends to a wide range of the product roll sheet which is the printed matter. In addition, there is also a risk that the situation of abnormality or damage of the apparatus main part will be worsened. The fourth determination mode is a determination mode provided from such a viewpoint.

An appropriate value based on an empirical rule is set as the fourth threshold value described above. In the fourth determination mode, instead of the number of times the adjustment error is detected after the printing job is started, the number of times the adjustment error is detected per unit time may be used as the index.

As described above, error-time operation determination function 102 according to the present embodiment includes a plurality of determination modes for determining whether to stop or continue printing that is currently being executed, on the assumption of various usages of image forming apparatus U by a user. However, error-time operation determination function 102 may include only one of the first to fourth determination modes.

Figure 6:
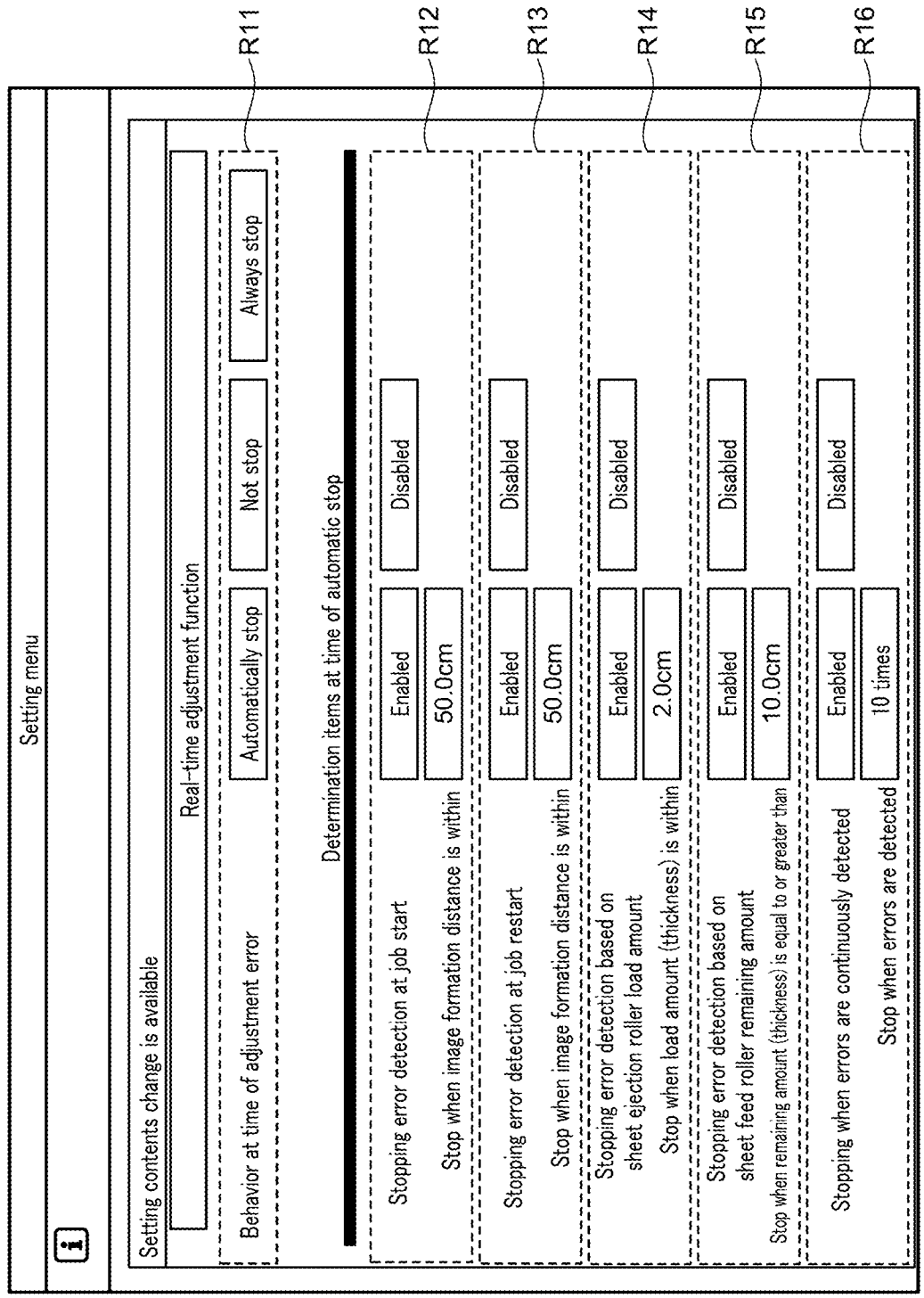
FIG. 6 is an illustration of an example of an operation screen for setting a determination mode to be applied when an adjustment error is detected in the image forming apparatus according to the embodiment.

FIG. 6 is a diagram showing an example of an operation screen for setting a determination mode to be applied in a case where an adjustment error is detected. Note that the operation screen in FIG. 6 is displayed on operation display section 20 in a manner in which a user can perform a selection operation, for example, before executing a printing job.

In the operation screen of FIG. 6, icons for changing the setting of the determination mode applied when the adjustment error is detected is displayed. The icons displayed are icon R11 related to "behavior at time of adjustment error," icon R12 related to "stopping error detection at job start," icon R13 related to "stopping error detection at job restart," icon R14 related to "stopping error detection based on sheet ejection roller load amount," icon R15 related to "stopping error detection based on sheet feed roller remaining amount," and icon R16 related to "stopping when errors are continuously detected." In this operation screen, the user can select whether or not to apply each item by the selection operation of these icons R11 to R16.

Icon R11 related to "behavior at time of adjustment error" is an icon for setting the operation of image forming apparatus U performed when an adjustment error is detected, and the user can select any one of "automatically stop," "not stop," and "always stop." Here, when "automatically stop" is selected, the determination mode set by icons R12 to R16 is applied, and image forming apparatus U automatically determines from the occurrence situation of the error whether to stop or continue the printing job.

Icons R12 to R16 are icons for selecting a determination mode to be applied in a case where "automatically stop" is selected and correspond to icons for selecting which of the first to the fourth determination modes described above is to be applied.

Icon R12 related to "stopping error detection at job start" is an icon for setting "enabled"/"disabled" of the first determination mode described above.

Icon R13 related to "stopping error detection at job restart" is an icon for setting "enabled"/"disabled" as to whether or not to apply the above-described first determination mode at the time of job restart.

Icon R14 for "stopping error detection based on sheet ejection roller load amount" is an icon for setting "enabled"/"disabled" of the second determination mode.

Icon R15 related to "stopping error detection based on sheet feed roller remaining amount" is an icon for setting "enabled"/"disabled" of the above-described third determination mode.

Icon R16 related to "stopping when errors are continuously detected" is an icon for setting "enabled"/"disabled" of the fourth determination mode described above.

In each of the determination items of the first to fourth determination modes, the user can change the setting of the threshold value of the determination criterion.

Here, in error-time operation determination function 102, for example, only one of the first to fourth determination modes can be set to "enabled." However, from a viewpoint of fail-safe, a plurality of determination modes may be set to "enabled" from among the first to the fourth determination modes. In this case, when the printing stop is determined in determination processing of one of the plurality of determination modes, error-time operation determination function 102 preferably stops the printing regardless of determination results of the other determination modes.

As illustrated in FIG. 6, error-time operation determination function 102 according to the present embodiment is configured to be able to make a change as to which is applied, by a setting operation of the user, for each of the above-described plurality of determination modes. As a result, the user can select the determination mode in consideration of the usage of image forming apparatus U, so that the occurrence situation of the adjustment error can be specified more accurately. That is, as a result, it is possible to stop the operation of image forming apparatus U only when the influence on the print image of the product roll sheet is significant, and it is possible to prevent the operation of image forming apparatus U from being stopped unnecessarily.

The determination processing at the time of the adjustment error detection by error-time operation determination function 102 has been described above. However, in a case where the printing job is continued without being stopped when an adjustment error of the real-time adjustment is detected, a contrivance for prompting a user to thereafter perform maintenance of image forming apparatus U and inspection of the printed product roll sheet is also important.

In such a viewpoint, for example, in a case where a printing job is allowed to continue when an adjustment error is detected, error-time operation determination function 102 may temporarily stop, upon completion of the printing job, the operation of image forming apparatus U without executing a next printing job reserved subsequent to the printing job. Note that a blank region is generated in the print image on the product roll sheet at this time but is at a printing job border position. Thus, the influence on the entire print image on the product roll sheet is relatively small. In some cases, insertion of a blank region is permitted for the printing job border position. At this timing, by repairing the apparatus state which is a factor of the error of the real-time adjustment, it is possible to suppress the recurrence of the error in the subsequent printing job.

Figure 7:
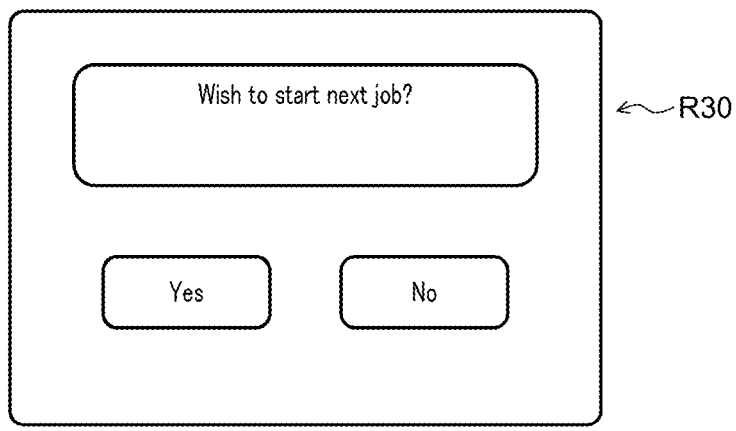
FIG. 7 is a diagram illustrating an example of a display screen on which an error history of the adjustment error can be viewed in the image forming apparatus according to the embodiment.

FIG. 7 is a diagram illustrating an example of an operation screen displayed on operation display section 20 before the start of the next printing job after the end of the printing job currently being executed in a case where the printing job is continued when the adjustment error is detected.

The operation screen in FIG. 7 displays, for example, icon ("Yes" or "No" in FIG. 7) R30 for inquiring about the start of the next printing job, and the user can give a job continuation instruction on the operation screen. Note that when "Yes" is selected in the operation screen in FIG. 7 (i.e., the job continuation instruction), for example, error-time operation determination function 102 starts execution of the next printing job, and when "No" is selected, for example, error-time operation determination function 102 displays an error history of real-time adjustment (see FIG. 8).

As a result, after finishing the printing job, it is possible to prompt the user to check the content of the adjustment error and check the product roll sheet.

Error history display function 103 is a function of storing a history of the detected adjustment error and displaying the history on operation display section 20 or the like in a case where the printing job is continued at the time of detection of the adjustment error as a result of the determination by error-time operation determination function 102. Error history display function 103 displays an error history display screen as shown in FIG. 8 on operation display section 20, for example, when the printing job is completed.

FIG. 8 is a diagram illustrating an example of a display screen on which an error history of adjustment errors can be viewed. FIG. 8 illustrates an exemplary aspect of error history display screen R20. In this mode, the job name of the printing job in which the adjustment error is detected, the printing distance from the start of the printing job at the time of detection of the adjustment error, the stop state at the time of detection of the adjustment error (that is, whether the printing operation is stopped or continued), and the adjustment error type are displayed in association with each other.

As a result, after finishing the printing job, it is possible to prompt the user to check the content of the adjustment error and check the product roll sheet.

For example, when an adjustment error is detected, error history display function 103 stores, in the storage section (for example, RAM 100c), the printing distance from the start of the printing job for the time of the adjustment error detection, the stop state at the time of the adjustment error detection (that is, whether the print operation has been stopped or continued), and the adjustment error type. Error history display function 103 generates a display screen related to the error history of the adjustment error based on these data.

Although not shown in FIG. 5, controller 100 may further include an error notification function instead of and/or in addition to error history display function 103. If an adjustment error has been detected during printing on roll sheet P, the error notification function notifies the user of the detection when printed roll sheet P is replaced. Image forming apparatus U usually monitors whether roll sheet P has been replaced, with a sensor (not illustrated) that detects whether or not roll sheet P is attached to sheet ejection roller 3a. The error notification function notifies the user of an adjustment error based on the sensor information, for example.

As a result, similarly, after the printing job is completed, the user can be prompted to confirm the content of the adjustment error or to inspect the product roll sheet.

Error mark printing function 104 is a function of printing a predetermined mark (hereinafter, referred to as an "error mark") on roll sheet P so as to indicate a position which is a factor of the adjustment error in roll sheet P in a case where the adjustment error of the real-time adjustment is detected.

Figure 9:
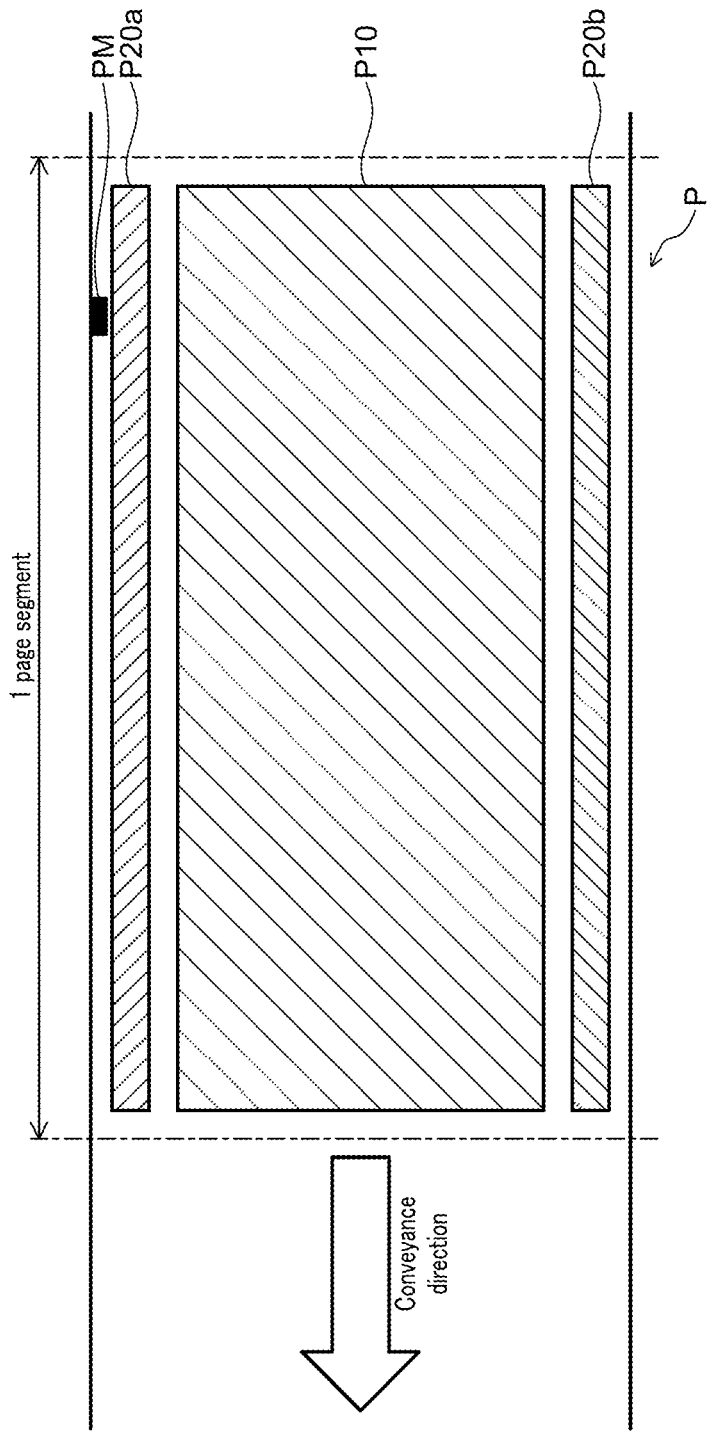
FIG. 9 is a diagram illustrating an example of the operation screen displayed after the currently executed printing job ends and before the next printing job starts in the image forming apparatus according to the present embodiment.

FIG. 9 illustrates an example of the error mark to be printed on roll sheet P. FIG. 9 illustrates an example in which error mark PM having a bar shape is formed together with adjustment patches P20a and P20b in the margin region of original document image formation region P10.

Error mark printing function 104 for example controls image forming section to print the error mark together with the document image and the adjustment patch on roll sheet P in printing on roll sheet P.

However, in this case, the timing at which error mark printing function 104 prints the error mark on roll sheet P is after the adjustment patch formed on roll sheet P which is a factor of the adjustment error passes through in-line scanner 70. That is, the position of the error mark is a position separated by one page or several pages from the position of the adjustment patch formed on roll sheet P which is a factor of the adjustment error. Therefore, for example, in the error history display screen or the like, it is preferable to add in advance an explanation for causing the user to recognize the correspondence relationship between the position of the error mark and the position of the adjustment patch formed on roll sheet P which is a factor of the adjustment error.

The form of the error mark is arbitrary, and may be a character, a symbol, or a pattern.

[Operation of Controller 100]

Figure 10:
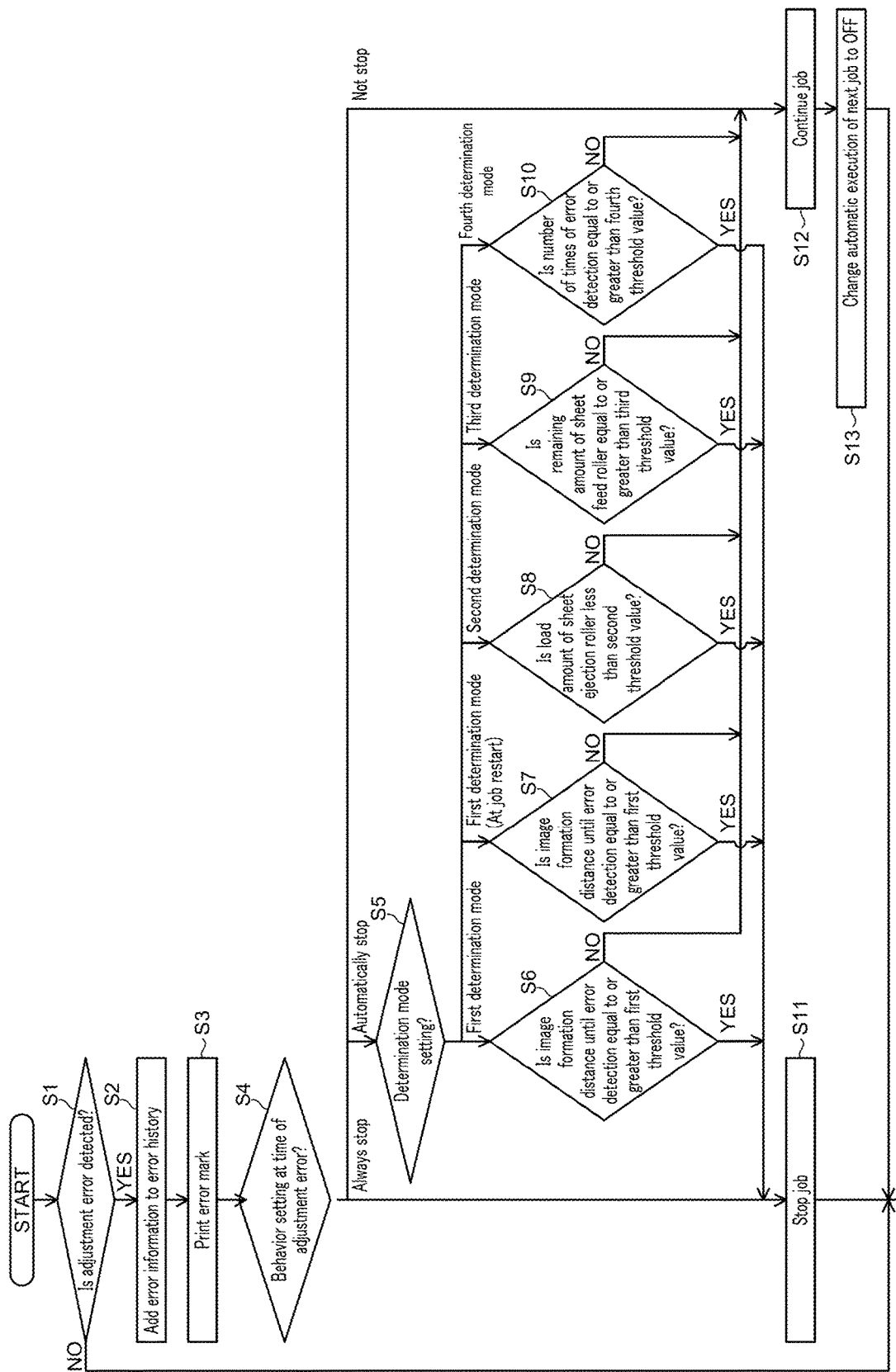
FIG. 10 is a flowchart illustrating an example of an operation performed by the controller when an adjustment error is detected in the image forming apparatus according to the embodiment.

FIG. 10 is a flowchart illustrating an example of operation performed by controller 100 (here, the functions of error-time operation determination function 102, error history display function 103, and error mark printing function 104) when an adjustment error is detected.

The flowchart of FIG. 10 illustrates an operation performed on each page during execution of a printing job in order for controller 100 to detect an abnormality in the real-time adjustment function. That is, controller 100 acquires, for each page, image information of an adjustment patch at an inspection-target position on roll sheet P from in-line scanner 70, performs adjustment control by real-time adjustment function 101, and then executes the flowchart of FIG. 10.

First, in step S1, controller 100 determines whether an adjustment error of the real-time adjustment has occurred, and in a case where the adjustment error has not been detected (step S1: NO), the processing of the flowchart of FIG. 10 ends. On the other hand, in a case where the adjustment error is detected (step S1: YES), controller 100 proceeds to step S2, and starts processing for determining the operation state of image forming apparatus U.

In step S2, controller 100 adds information of the adjustment error to the storage section (for example, RAM 100c) that stores the error history.

In step S3, controller 100 instructs image forming section 40 to print an error mark at the time of image formation of the next page.

In step S4, controller 100 checks the setting of the behavior at the time of the adjustment error detection. Here, it is assumed that the behavior at the time of the adjustment error detection is set in advance by the user before the printing is started. The behavior setting information is stored in, for example, the storage section (for example, RAM 100c), and controller 100 reads the behavior setting information from the storage section in step S4 and step S5.

In this step S4, for example, controller 100 checks whether the behavior setting at the time of adjustment error detection is set to "always stop," "not stop," or "automatically stop." Controller 100 advances the processing to step S11 in a case where "always stop" is set, advances the processing to step S12 in a case where "not stop" is set, and advances the processing to step S5 in a case where "automatically stop" is set.

In step S5, controller 100 reads, from the storage section (e.g., RAM 100c), the setting of "enabled"/"disabled" for each of the first to fourth determination modes in the "automatically stop." In steps S6 to S10, controller 100 performs operation determination conforming to the determination criterion of the determination mode in which "enabled" is set.

In particular, in step S6, controller 100 determines whether or not the image formation distance until error detection in the printing job currently being executed is equal to or greater than the first threshold value. In a case where the image formation distance is equal to or greater than the first threshold value (step S6: YES), controller 100 advances the processing to step S11. In a case where the image formation distance is less than the first threshold value (step S6: NO), controller 100 advances the processing to step S12.

Further, in step S7, controller 100 determines whether the image formation distance until the error detection in the printing job currently being executed is equal to or greater than the first threshold value. In a case where the image formation distance is equal to or greater than the first threshold value (step S7: YES), controller 100 advances the processing to step S11. In a case where the image formation distance is less than the first threshold value (step S7: NO), controller 100 advances the process to step S12 (step S7 is applied in a case where the first determination mode is set to be applied also when the printing is resumed).

Further, in step S8, controller 100 determines whether the load amount of the sheet ejection roller is less than the second threshold value. If the load amount is less than the second threshold value (step S8: YES), controller 100 proceeds to step S11. If the load amount is equal to or greater than the second threshold value (step S8: NO), controller 100 proceeds to step S12.

In step S9, controller 100 determines whether the remaining amount of the sheet feed roller is equal to or greater than the third threshold value. If the remaining amount is equal to or greater than the third threshold value (step S9: YES), controller 100 advances the process to step S11. If the remaining amount is less than the third threshold value (step S9: NO), controller 100 advances the process to step S12.

In step S10, controller 100 determines whether the number of times of error detection is equal to or greater than the fourth threshold value. If the number of times of error detection is equal to or greater than the fourth threshold value (step S10: YES), controller 100 advances the process to step S11. If the number of times of error detection is smaller than the fourth value (step S10: NO), controller 100 advances the process to step S12.

In step S11, controller 100 stops the printing job currently being executed.

In step S12, controller 100 determines to continue the printing job currently being executed and holds the determination history as an error history.

In step S13, controller 100 changes automatic execution of the next job to OFF.

Controller 100 performs the determination process as described above to determine the operation of image forming apparatus U (that is, to stop or continue printing) when the adjustment error of real-time adjustment function 101 is detected. Accordingly, in particular, in a case where the user sets the "automatically stop" as the behavior setting at the time of detection of the adjustment error, it is possible to determine, based on the occurrence situation of the detected adjustment error, whether to stop or continue the printing which is currently being executed.

In the flowchart of FIG. 10, as the setting at the time of "automatically stop," the processing in the mode in which only one determination mode of the first to fourth determination modes is set to "enabled" and the other determination modes are set to "disabled" has been described. However, from the viewpoint of fail-safe, controller 100 (error-time operation determination function 102) may adopt a configuration in which a plurality of modes among the first to the fourth determination modes can be set to "enabled" as the setting at the time of "automatically stop." This configuration is a configuration in which determination is performed for all of the determination modes to be applied, and the printing job is stopped in a case where any one determination result is obtained which indicates that a print image is highly likely to be significantly affected.

Effects

As described above, image forming apparatus U according to the present embodiment includes: an image former that includes an image bearing member carrying toner and that prints an image on a roll sheet, the image being formed by exposure of and development processing on the image bearing member; an image reader that reads the image formed on the roll sheet; and a hardware processor that functions as a controller for controlling the image former based on a printing job for which an execution instruction is received, in which the controller has a real-time adjustment function of printing an adjustment image on the roll sheet, acquiring a reading result of reading the adjustment image from the image reader, and adjusting an image forming condition in the image former in real time based on the reading result while the printing job is being executed, and an error-time operation determination function of determining whether to stop or continue the printing job, when an adjustment error indicating failure of the adjustment in the real-time adjustment function is detected, the determining being based on an occurrence situation of the adjustment error.

According to image forming apparatus U of the present embodiment, it is possible to minimize the frequency at which the printing operation of image forming apparatus U is temporarily stopped, and it is possible to suppress the frequency at which a blank region is inserted into the print image of the product roll sheet.

In particular, image forming apparatus U according to the present embodiment is configured to have a plurality of determination modes for determining whether to stop or continue printing that is currently being executed, on the assumption of various usages of image forming apparatus U by the user, and is configured to be able to make a change as to which is applied, for each of the plurality of determination modes. Thus, the user can select a determination mode that takes into account the usage of image forming apparatus U. That is, it is thus possible to prevent the operation of image forming apparatus U from being unnecessarily stopped.

Specific examples of the present invention have been described in detail above, but these are merely examples and do not limit the scope of the claims. The technology described in the claims includes various modifications and changes of the specific examples exemplified above.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus of a roll-to-roll type, comprising:
   an image former that includes an image bearing member carrying toner and that prints an image on a roll sheet, the image being formed by exposure of and development processing on the image bearing member;
   an image reader that reads the image formed on the roll sheet; and
   a hardware processor that functions as a controller for controlling the image former based on a printing job for which an execution instruction is received, wherein
   the controller has
      a real-time adjustment function of printing an adjustment image on the roll sheet, acquiring a reading result of reading the adjustment image from the image reader, and adjusting an image forming condition in the image former in real time based on the reading result while the printing job is being executed, and
      an error-time operation determination function of determining whether to stop or continue the printing job, when an adjustment error indicating failure of the adjustment in the real-time adjustment function is detected, the determining being based on an occurrence situation of the adjustment error; and
   wherein the error-time operation determination function stops the printing job in a case where the adjustment error is detected when an image formation distance of image formation onto the roll sheet in the printing job is less than a first threshold value, and continues the printing job in a case where the adjustment error is detected when the image formation distance of image formation onto the roll sheet in the printing job is equal to or greater than the first threshold value.

2. The image forming apparatus according to claim 1, wherein
   the error-time operation determination function stops the printing job in a case where the adjustment error is detected when a load amount of the roll sheet wound around a sheet ejection roller is smaller than a second threshold value, and continues the printing job in a case where the adjustment error is detected when the load amount of the roll sheet wound around the sheet ejection roller is equal to or greater than the second threshold.

3. The image forming apparatus according to claim 1, wherein
   the error-time operation determination function stops the printing job in a case where the adjustment error is detected when a remaining amount of the roll sheet wound around a sheet feed roller is equal to or greater than a third threshold value, and continues the printing job in a case where the adjustment error is detected when the remaining amount of the roll sheet wound around the sheet feed roller is less than the third threshold value.

4. The image forming apparatus according to claim 1, wherein
   the error-time operation determination function stops the printing job in a case where a number of times the adjustment error is detected after the printing job is started is equal to or greater than a fourth threshold value, and continues the printing job in a case where the number of times the adjustment error is detected after the printing job is started is less than the fourth threshold value.

5. The image forming apparatus according to claim 1, wherein a threshold value that is used as a reference when the error-time operation determination function determines whether to stop or continue the printing job is capable of being set by a user.

6. The image forming apparatus according to claim 1, wherein:
   the error-time operation determination function includes a plurality of determination modes for estimating an influence of an occurrence cause of the adjustment error on subsequent printing from the occurrence situation of the adjustment error, and
   the error-time operation determination function is configured such that whether each of the plurality of determination modes is enabled or disabled is capable of being switched according to user setting.

7. The image forming apparatus according to claim 1, wherein
   the controller further has an error history display function of storing a history of the detected adjustment error and displaying the history on a display in a case where the printing job is continued by determination of the error-time operation determination function when the adjustment error is detected.

8. The image forming apparatus according to claim 1, wherein
   the controller further has an error mark printing function of printing a predetermined mark on the roll sheet when the adjustment error is detected, the predetermined mark being printed to indicate a position within the roll sheet, the position being a factor of the adjustment error.

9. The image forming apparatus according to claim 1, wherein
   in a case where the printing job is continued when the adjustment error is detected, and when the printing job is completed, the error-time operation determination function temporarily stops an operation of an apparatus main part without executing a next printing job reserved subsequently to the printing job.

10. The image forming apparatus according to claim 9, wherein
    the error-time operation determination function waits for a job continuation instruction from a user and starts execution of the next printing job.

11. The image forming apparatus according to claim 1, wherein
    the controller further has an error notification function that, when a printed roll sheet is replaced, a user is notified that the adjustment error has been detected for the printed roll sheet during execution of printing on the roll sheet.

12. A control method for controlling an image forming apparatus of a roll-to-roll type, the control method comprising:
    printing an adjustment image on a roll sheet, acquiring a reading result of reading the adjustment image from an image reader, and adjusting an image forming condition in an image former in real time based on the reading result while a printing job is being executed; and
    determining whether to stop or continue the printing job, when an adjustment error indicating failure of the adjustment is detected, the determining being based on an occurrence situation of the adjustment error;
    wherein the printing job is stopped in a case where the adjustment error is detected when an image formation distance of image formation onto the roll sheet in the printing job is less than a first threshold value, and wherein the printing job is continued in a case where the adjustment error is detected when the image formation distance of image formation onto the roll sheet in the printing job is equal to or greater than the first threshold value.

13. A non-transitory computer-readable storage medium storing a control program for an image forming apparatus of a roll-to-roll type, wherein
when the control program is executed by a computer, the computer
prints an adjustment image on a roll sheet, acquires a reading result of reading the adjustment image from an image reader, and adjusts an image forming condition in an image former in real time based on the reading result while a printing job is being executed; and
determines whether to stop or continue the printing job, when an adjustment error indicating failure of the adjustment is detected, the determining being based on an occurrence situation of the adjustment error;
wherein the computer stops the printing job in a case where the adjustment error is detected when an image formation distance of image formation onto the roll sheet in the printing job is less than a first threshold value, and wherein the computer continues the printing job in a case where the adjustment error is detected when the image formation distance of image formation onto the roll sheet in the printing job is equal to or greater than the first threshold value.

* * * * *